(12) United States Patent
Munson et al.

(10) Patent No.: US 6,723,756 B2
(45) Date of Patent: Apr. 20, 2004

(54) AQUEOUS SEPARATION OF SYNGAS COMPONENTS

(75) Inventors: Curtis L. Munson, Oakland, CA (US); Dennis J. O'Rear, Petaluma, CA (US); Daniel Chinn, Concord, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 95 days.

(21) Appl. No.: 10/133,437

(22) Filed: Apr. 29, 2002

(65) Prior Publication Data

US 2003/0203983 A1 Oct. 30, 2003

(51) Int. Cl.$^7$ .......................... C07C 27/00; B01D 47/04
(52) U.S. Cl. .................. 518/700; 518/702; 518/705; 95/150
(58) Field of Search ................................. 518/700, 702, 518/705; 95/150

(56) References Cited

U.S. PATENT DOCUMENTS

| 5,423,894 | A  | 6/1995  | Child et al. |
| 5,929,126 | A  | 7/1999  | Koveal et al. |
| 6,063,349 | A  | 5/2000  | Koveal, Jr. et al. |
| 6,248,794 | B1 | 6/2001  | Gieskes |
| 6,497,852 | B2 | 12/2002 | Chakravarti et al. |

FOREIGN PATENT DOCUMENTS

| EP | 0 142 887 A2 | 5/1985 |
| EP | 0 516 441 A1 | 12/1992 |
| GB | 787121 | 12/1957 |
| WO | WO 95/20558 A1 | 8/1995 |
| WO | WO 03/024604 A2 | 3/2003 |

OTHER PUBLICATIONS

UK Search Report dated Sep. 5, 2003.

*Primary Examiner*—J. Parsa
(74) *Attorney, Agent, or Firm*—Burns, Doane, Swecker & Mathis, L.L.P.

(57) ABSTRACT

Unreacted syngas containing $CO_2$ from a Fischer-Tropsch synthesis reactor, a methanol synthesis reactor or a dual functional syngas conversion is scrubbed with an aqueous medium to adsorb at least some of the $CO_2$. At least a portion of the unreacted $CO_2$-depleted syngas is then recycled to the reactor. The aqueous medium containing absorbed $CO_2$ is treated to desorb $CO_2$. A $CO_2$-enriched stream and a $CO_2$-depleted stream are recovered. A portion of the $CO_2$-enriched stream may be recycled to a syngas generator while another portion is dissolved in an aqueous phase and disposed in a marine environment and/or a terrestrial formation. The $CO_2$-depleted stream preferably is used in the scrubber to absorb $CO_2$ from the unreacted syngas. The process reduces the amount of $CO_2$ released into the atmosphere while improving the over-all efficiency of the syngas conversion process.

29 Claims, 2 Drawing Sheets

AQUEOUS SEPARATION OF SYNGAS COMPONENTS

CROSS-REFERENCE TO RELATED APPLICATIONS

The present application is related to application Ser. Nos. 09/951,551, 09/951,552 and 9/951,553, filed Sep. 14, 2001, the entire contents of which are expressly incorporated herein.

BACKGROUND OF THE INVENTION

1. Field of the Invention

This invention relates to a treatment of unreacted synthesis gas (syngas) produced in a gas-to-liquid synthesis and more particularly to a process of contacting unreacted syngas with water to remove $CO_2$.

2. Description of Related Art

There is a considerable economic incentive to exploit the production of natural gas which is an abundant resource normally available only at remote sites. Frequently, it is not economically viable to transport natural gas from such remote sites to commercial markets or off-site processing facilities. One approach has been to convert the natural gas into liquified natural gas (LNG) for transport to markets or processing facilities. Another approach has involved converting natural gas into methanol at the remote site without further processing of methanol into gasoline.

Natural gas is a primary source of methane which is used to manufacture synthesis gas. Synthesis gas (syngas) is primarily a mixture composed of CO and $H_2$. Techniques are known to convert syngas into useful products such as methanol or into synthetic fuels, lubricants and other hydrocarbonaceous products via Fischer-Tropsch synthesis. One method for the preparation of syngas involves catalytically reacting methane and carbon dioxide. While natural gas is a primary source of methane, coal and petroleum have also been utilized to provide hydrocarbon feeds to generate syngas.

Carbon dioxide is considered by some to be a major factor in global warming. Accordingly, there is an incentive to find means for reducing the production of carbon dioxide and limiting its release into the environment. One advantage of the aforementioned process for preparing syngas is that it utilizes carbon dioxide as a reactant.

At present, there are two gas-to-liquid (GTL) technologies which convert remote natural gas assets or coal into transportation fuels and lubricants. Both use syngas as an intermediate. The first involves the conversion of natural gas or coal into syngas by partial oxidation followed by reaction in a Fischer-Tropsch synthesis with further refining of the Fischer-Tropsch products. The second technology involves conversion of natural gas or coal into syngas by partial oxidation followed by methanol synthesis, the methanol being subsequently converted into highly aromatic gasoline by the Methanol-To-Gasoline (MTG) process.

The Fischer-Tropsch and MTG processes both have relative merits and disadvantages. One advantage of the Fischer-Tropsch process is that the products formed are highly paraffinic. These products have excellent combustion and lubricating properties. A disadvantage of the Fischer-Tropsch process is the relatively large amounts of carbon dioxide that are emitted in the facility during the conversion of natural gas into Fischer-Tropsch products. The MTG process produces a highly aromatic gasoline and LPG fraction. While the gasoline generally is suitable for use in gasoline engines, durene and other polymethyl aromatics may be present. These materials have high crystallization temperatures and can solidify upon standing. The MTG process also suffers from higher capital costs in comparison to the Fischer-Tropsch process and the product cannot be used for lubricants, diesel fuel or jet turbine fuel.

A typical Fischer-Tropsch process is illustrated in FIG. 1. A feed of $CH_4$, $O_2$ and $H_2O$ is forwarded via conduit (10) to a syngas generator (15). Effluent from the generator containing CO, $H_2$ and $CO_2$ is forwarded via conduit (20) to a Fischer-Tropsch reactor (25). The products of the reaction are forwarded via conduit (35) to a separation zone (40). Hydrocarbonaceous products including $C_5+$ liquids are recovered and forwarded via conduit (45) to other areas of the facility for further processing into fuels, lubes, etc. Gaseous products recovered from the separation zone (e.g. tail gas) include CO, $H_2$ and $CO_2$. A portion of the tail gas is forwarded via conduit (60) for use as a fuel in the facility. Another portion of the tail gas is recycled via conduit (50) to be mixed with the feed to the syngas generator (15).

The origin of the $CO_2$ emissions from the Fischer-Tropsch synthesis can best be understood by examining the stoichiometry of the reaction. The major products of a Fischer-Tropsch reaction are paraffins and olefins, and these can be represented by the formula $nCH_2$ which represents a paraffinic polymer of n $CH2$ units This formula is exact for mono-olefins and a close approximation for $C_5+$ paraffins. The value of n (the average carbon number of the product) is determined by the reaction conditions, e.g., temperature, pressure, space rate, catalyst type, and syngas composition. The desired net syngas stoichiometry for a Fischer-Tropsch reaction is independent of n, and is approximately 2.0 as determined by the following equation:

$$nCO + 2nH_2 \rightarrow nH_2O + nCH_2$$

where $nCH_2$ represent the major products of a Fischer-Tropsch reaction (olefins and paraffins).

There are three general reactions that produce syngas from $CH_4$. These are:

Steam reforming of $CH_4$:

$$CH_4 + H_2O \rightarrow CO + 3H_2$$

However, the ratio of $H_2$ to CO is 3:1 which is higher than the 2:1 ratio desired for the Fischer-Tropsch conversion.

Dry reforming, or reaction between $CO_2$ and $CH_4$:

$$CH_4 + CO_2 \rightarrow 2CO + 2H_2$$

However, the ratio of $H_2$ to CO is 1:1, which is lower than that desired for the Fischer-Tropsch conversion. Also, dry reforming may result in rapid carbon deposition.

Partial oxidation using $O_2$:

$$CH_4 + \tfrac{1}{2}O_2 \rightarrow CO + 2H_2.$$

This provides the desired 2:1 ratio of CO and $H_2$ and is the reaction that is to be emphasized.

In commercial practice, an amount of steam is added to a partial oxidation reformer in order to control carbon formation. Likewise, some $CO_2$ can be tolerated in the feed. So while partial oxidation is the emphasized reaction, all reactions occur to some extent in the reformer.

$CO_2$ is formed in partial oxidation because the reaction is not perfectly selective. Some $CH_4$ reacts with $O_2$ to form $CO_2$ by complete combustion according to the following:

$$CH_4 + O_2 \rightarrow CO_2 + 2H_2$$

and $$CH_4 + 2O_2 \rightarrow CO_2 + 2\,H_2O$$

Furthermore, steam added to the reformer to control coking, or produced in the Fischer-Tropsch reaction, can react with CO to form $CO_2$ by the water gas shift reaction as follows:

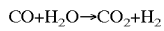

$$CO+H_2O \rightarrow CO_2+H_2$$

This reaction reaches equilibrium, and the reverse of it is known as the reverse water gas shift reaction:

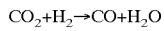

$$CO_2+H_2 \rightarrow CO+H_2O$$

Furthermore, light by-product gases, which include $C_1$–$C_4$ hydrocarbons, are frequently used as fuel in furnaces. This fuel often includes the $CO_2$ from the GTL facility along with some unreacted CO. The furnaces provide the heat to the process, and contribute significant amounts of $CO_2$. With Fischer-Tropsch catalysts that do not promote the water gas shift reaction (Co-based catalyst rather than Fe-based catalysts), and with proper operation of the reformer and other units, the major source of $CO_2$ is combustion of hydrocarbons in the furnaces.

Thus, a significant amount of $CO_2$ is formed during the conversion of $CH_4$ into transportation fuels and lubricants by the Fischer-Tropsch process. This $CO_2$ exits the GTL-Fischer-Tropsch process in the tail gas from the Fischer-Tropsch unit, i.e., in the gases that are not consumed in the Fischer-Tropsch reactor.

The overall proportion of carbon in the $CH_4$ that is converted to heavier hydrocarbon products is estimated to be about 68%. The remainder, about 32%, forms significant amounts of $CO_2$. These estimates of carbon efficiency were provided by Bechtel Corporation for a GTL complex that uses cryogenic air separation, an autothermal reformer, a slurry bed Fischer-Tropsch unit and a hydrocracker for conversion of the heavy wax into products. Details are described in "$CO_2$ Abatement in GTL Plant: Fischer-Tropsch Synthesis," Report # PH3/15, November 2000, published by the IEA Greenhouse Gas R&D Programme. GTL complexes using alternative technologies would have similar carbon efficiencies and $CO_2$ emissions.

To control the reaction, syngas conversion processes operate at less than 100% conversion of the CO in the syngas. Typical values are between 40 and 70% per-pass conversion. In Fischer-Tropsch processes which use $O_2$ rather than air, the unreacted syngas is recycled to the Fischer-Tropsch reactor. From the standpoint of economics and operational efficiency, the preferred Fischer-Tropsch process is a slurry bed process. Also, the most common catalyst for use in slurry bed units contains cobalt. Cobalt does not promote the water gas shift reaction to a significant extent (or the reverse of this reaction). In these units, $CO_2$ for the most part, is an inert gas. As $CO_2$ is recycled to the syngas conversion reactor, its concentration builds up. This effectively lowers the concentration of the reactive syngas components ($CO+H_2$), and reduces the rate of reaction. To compensate for the lower partial pressures of the reactive components, the pressure of the Fischer-Tropsch reactor is increased. During this recycle operation, a small amount of $CO_2$ in the initial syngas (typically 5 vol % but always 2% or more) increases to much larger values (typically 40 vol %). In commercial practice, typically a portion of the $CO_2$-enriched recycle gas is recycled to the syngas formation reactor where it promotes the dry reforming reaction and reduces the ratio of $H_2$ to CO in the syngas to the desired level. The recycle of $CO_2$ to the syngas generator reduces the selectivity for $CO_2$ formation and improves the selectivity for formation of the desirable syngas components CO and $H_2$. This is because $CO_2$ is produced in equilibrium with CO, $H_2$ and $H_2O$ due to the water gas shift reaction. However, much more $CO_2$ is produced than can be consumed in the syngas generator, and the excess $CO_2$-enriched recycle gas is purged from the process and used as a low energy content fuel. The use of this low energy content fuel is a significant source of the $CO_2$ emissions from the GTL facility.

A process scheme which reduces the $CO_2$ emissions from a Fischer-Tropsch-GTL process while still making the desired product slate would be highly desirable. Reducing the $CO_2$ emissions also acts to improve the carbon efficiency of the process.

EP0 516 441 A1 discusses several aspects of handling $CO_2$ in a Fischer-Tropsch-GTL process including: separating $CO_2$ from the syngas generated in the reformer, and recycling the unreacted tail gas from Fischer-Tropsch to the reformer. As discussed previously, the recycling of $CO_2$ is to achieve proper $H_2/CO$ ratio of syngas. This publication notes that: "Separation of carbon dioxide is expensive. It is often carried out by amine stripping. This involves reaction with an amine, followed by boiling, and compression to reach the necessary pressure for recycle back to the reformer." (page 3, lines 4–6). Likewise: "The cost of removing and recycling the $CO_2$ is expensive and typically would represent around 30% of the costs associated with producing the syngas within the process." (page 4, lines 45–46).

EP 142 887 B1 discusses the benefits of having $CO_2$ in the feed to the reformer. It also mentions the high costs associated with the separation of the $CO_2$ from the syngas by amine scrubbing and subsequent compression.

Neither of these publications disclose the use of an aqueous medium to remove $CO_2$ from syngas. The use of an aqueous medium to remove $CO_2$ significantly reduces costs associated with typical amine scrubbing, and also provides a source of water for use in the reforming reaction.

It is an object of the invention to provide an efficient process which reduces the cost of separating $CO_2$ in recycled synthesis gas.

It is another object of the invention to develop a technique which lowers the $CO_2$ emissions from a GTL facility.

These and other objects and advantages of the present invention will become apparent to the skilled artisan upon a review of the following description, the claims appended thereto, and the figures of the drawings.

SUMMARY OF THE INVENTION

These and other objectives of the invention are attained by a process which includes the steps of:

A process comprising the following steps:
(a) forming a syngas which contains $CO_2$ in a syngas generator;
(b) reacting the syngas in a syngas conversion process to form a product stream comprising hydrocarbonaceous products and a tail gas containing unreacted syngas and $CO_2$;
(c) separating the hydrocarbonaceous products from the unreacted syngas and $CO_2$;
(d) contacting at least a portion of the unreacted syngas and $CO_2$ with an aqueous medium having a pH above about 6.0 in a scrubbing zone to adsorb at least a portion of the $CO_2$, and recovering a $CO_2$-enriched aqueous stream and a syngas with reduced $CO_2$ concentration;
(e) forwarding at least part of the recovered syngas from step (d) to the syngas conversion reactor; and
(f) desorbing at least part of the $CO_2$ from the $CO_2$-enriched aqueous stream obtained in step (d) and recovering a $CO_2$-rich gas and $CO_2$-depleted aqueous stream.

Desorption can be accomplished, for example, by contacting the $CO_2$-enriched aqueous stream with $CH_4$ in a desorption vessel. Recovered $CH_4$ can be recycled to the syngas generator. Portions of the recovered $CO_2$ can be disposed in a marine environment, a terrestrial formation or both.

The recycling of $CO_2$ and $CH_4$ to the syngas formation reactor increases the carbon efficiency of the process. The separation of CO and $H_2$ and the processing of these gases in the syngas conversion unit thereby avoids forwarding them to the syngas formation reactor. This reduces the total amount of gases processed in the syngas formation reactor while shifting the equilibrium towards the desired CO and $H_2$.

BRIEF DESCRIPTION OF THE FIGURE OF THE DRAWING

DETAILED DESCRIPTION OF PREFERRED EMBODIMENTS

Figure 1:
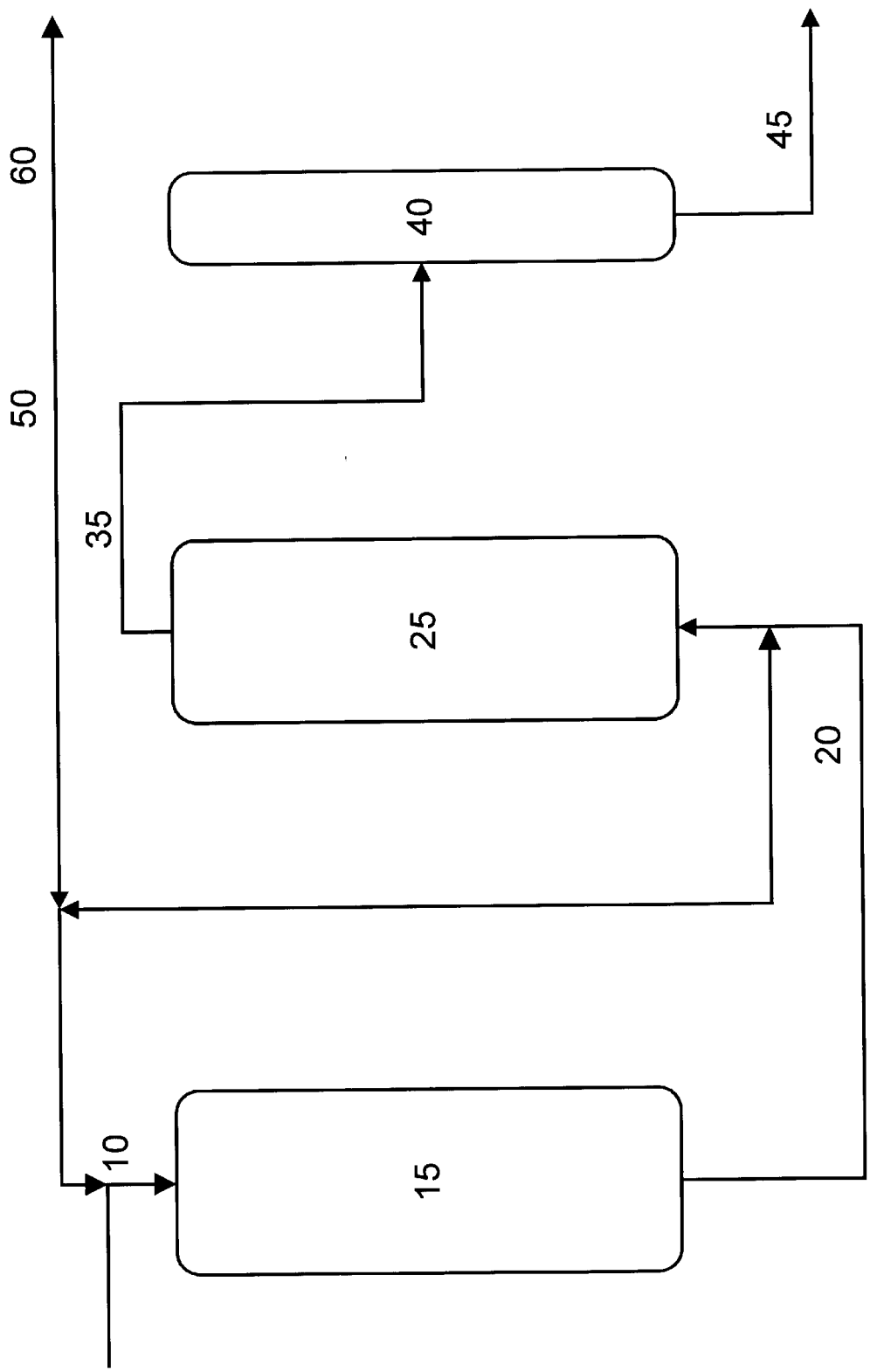
FIG. 1 is a schematic flow diagram of a conventional Fischer-Tropsch synthesis.

The syngas generator can be a light hydrocarbon reformer or a heavy hydrocarbon reformer. Reforming includes a variety of technologies such as steam reforming, partial oxidation, dry reforming, series reforming, convective reforming, and autothermal reforming. All have in common the production of syngas from methane and an oxidant (steam, oxygen, carbon dioxide, air, enriched air or combinations). The gas product typically contains some carbon dioxide and steam in addition to syngas. Series reforming, convective reforming and autothermal reforming incorporate more than one syngas-forming reaction in order to better utilize the heat of reaction. The processes for producing synthesis gas from $C_1$–$C_3$ alkanes are well known to the art. Steam reformation is typically effected by contacting $C_1$–$C_3$ alkanes with steam, preferably in the presence of a reforming catalyst, at a temperature of about 1300° F. (705° C.) to about 1675° F. (913° C.) and pressures from about 10 psia (0.7 bars) to about 500 psia (34 bars). Suitable reforming catalysts which can be used include, for example, nickel, palladium, nickel-palladium alloys, and the like. Regardless of the system used to produce syngas it is desirable to remove any sulfur compounds, e.g., hydrogen sulfide and mercaptans, contained in the $C_1$–$C_3$ alkane feed. This can be effected by passing the $C_1$–$C_3$ alkane gas through a packed bed sulfur scrubber containing zinc oxide bed or another slightly basic packing material. If the amount of $C_1$–$C_3$ alkanes exceeds the capacity of the synthesis gas unit, the surplus $C_1$–$C_3$ alkanes can be used to provide energy throughout the facility. For example, excess $C_1$–$C_3$ alkanes may be burned in a steam boiler to provide the steam used in a thermal cracking step.

In a heavy hydrocarbon reformer, the process involves converting coal, heavy petroleum stocks such as resid, or combinations thereof, into syngas. The temperature in the reaction zone of the syngas generator is about 1 800° F.–3000° F. and the pressure is about 1 to 250 atmospheres. The atomic ratio of free oxygen in the oxidant to carbon in the feedstock (O/C, atom/atom) is about 0.6 to 1.5, preferably about 0.80 to 1.3. The free oxygen-containing gas or oxidant may be air, oxygen-enriched air, i.e., greater than 21 up to 95 mole % $O_2$ or substantially pure oxygen, i.e., greater than 95 mole % $O_2$. The effluent gas stream leaving the partial oxidation gas generator generally has the following composition in mole % depending on the amount and composition of the feed streams: $H_2$:8.0 to 60.0; CO:8.0 to 70.0; $CO_2$:1.0 to 50.0, $H_2O$:2.0 to 75.0, $CH_4$:0.0 to 30.0, $H_2S$:0.1to 2.0, COS:0.05 to 1.0, $N_2$0.0 to 80.0, Ar:0.0 to 2.0. Particulate matter entrained in the effluent gas stream may comprise generally about 0.5 to 30 wt. % more, particularly about 1 to 10 wt. % of particulate carbon (basis weight of carbon in the feed to the gas generator). Fly ash particulate matter may be present along with the particulate carbon and molten slag. Conventional gas cleaning and/or purification steps may be employed such as that described in U.S. Pat. No. 5,423,894.

The mixture generated in the syngas reactor is then cycled to a syngas converter, preferably a Fischer-Tropsch reactor. As indicated earlier, the Fischer-Tropsch synthesis is well-known and widely documented in patent and technical literature. The synthesis converts syngas into a wide variety of hydrocarbonaceous products by contact with a Fischer-Tropsch catalyst under suitable temperatures and pressures. The reaction is typically conducted at temperatures ranging from about 300°–700° F., preferably about 400°–550° F., pressures ranging from about 10 to 500 psia, preferably about 30 to 300 psia, and a catalyst space velocities ranging from about 100 to 10,000 cc/g/hr., preferably about 300 to 3,000 cc/g/hr. The reaction can be conducted in a variety of reactors such as fixed bed reactors containing one or more catalyst beds, slurry reactors, fluidized bed reactors, or a combination of different types reactors. The products may range from $C_1$ to $C_{200}$ + hydrocarbons with a majority in the range of $C_5$–$C_{100}$+. The syngas feed to a Fischer Tropsch reactor contains—less than 1 ppm, preferably less than 100 ppb, most preferably less than 10 ppb sulfur.

Products from the Fischer-Tropsch reactor are cycled to a separation zone. Hydrocarbons including $C_5$+ liquids are separated and forwarded to processing areas for conversion into fuels, lubricants, etc. Tail gas recovered from the separation zone contains CO, H2, $CO_2$, $CH_4$ and other light hydrocarbons. A portion of the tail gas is drawn off and used as fuel. An important feature of the present invention involves contacting at least a portion of the tail gas with an aqueous medium in a scrubber preferably at above atmospheric pressure to remove $CO_2$ and optionally $CH_4$ by absorption and admixing the resultant $CO_2$-depleted tail gas with the syngas feed to the syngas converter. The $CO_2$-rich aqueous stream recovered from the scrubber preferably is processed to desorb at least some $CO_2$ and optionally $CH_4$. A $CO_2$-enriched gas is recovered and at least a portion thereof is recycled to the syngas generator. A $CO_2$-depleted aqueous stream is recovered from the desorbing zone and at least a portion is recycled to the scrubber. At least a portion of the $CO_2$-enriched gas recovered from the desorbing zone may be dissolved in an aqueous phase and disposed in a marine environment, and/or a terrestrial formation.

In the present invention, at least a portion of $CO_2$ generated in Fischer-Tropsch GTL process is isolated from the tail gas by scrubbing with an aqueous stream, preferably at a pressure greater than about atmospheric pressure to assist in the removal of $CO_2$. Although scrubbing in accordance with the present invention can be performed in any number of locations in a GTL process, preferably, scrubbing is not conducted upon streams that contain significant amounts of liquid hydrocarbons. In particular, scrubbing to remove $CO_2$ from streams that also contain significant amounts of liquid hydrocarbons is avoided because the presence of significant amount of liquid hydrocarbons can make separation more difficult.

Since the amount of $CO_2$ that can be dissolved in an aqueous stream is dependent on pressure, it is desirable to conduct scrubbing at pressures greater than atmospheric. In addition, because many $CO_2$-containing streams in a GTL process are at pressures greater than atmospheric, scrubbing can be conducted in a number of possible locations.

There are several sources of aqueous streams for scrubbing that are suitable for the present invention. Suitable sources include, but are not limited to, sea water, reaction water formed in a Fischer-Tropsch GTL process, spent cooling water from a FischerTropsch GTL facility, river water or other non-potable water sources, and water recovered from crude or gas production.

The pH of the aqueous stream used in scrubbing is important. Preferably, the aqueous streams exhibit a pH greater than about 6.0, preferably above 7.0 and most preferably, from about 7.5 to about 11.0. A high pH aqueous stream facilitates scrubbing of $CO_2$. The pH of the aqueous stream used for scrubbing $CO_2$ can be increased using any number of suitable techniques. These include, but are not limited to, adding an alkali such as NaOH or KOH and/or other basic materials, such as ammonia. Use of amines in the aqueous stream should be avoided—less than 1 wt % is preferred. However, because these materials must be disposed of, they should be inexpensive and benign to the environment in which they will be disposed. Accordingly, in view of the need to minimize cost and environment impact, preferred aqueous sources include, but are not limited to, sea water, river water, or other non-potable water sources from the environment GTL process water may be a particularly suitable aqueous source because it is abundantly produced during Fischer-Tropsch GTL processing. For instance, when referring to the stoichiometric equation governing the conversion of synthesis gas to Fischer-Tropsch products:

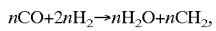

$$nCO+2nH_2 \rightarrow nH_2O+nCH_2,$$

It can be seen that the weight ratio of water to hydrocarbon produced by the reaction is about 1.25. Thus, a typical Fischer-Tropsch GTL process produces about 25% more water than hydrocarbon, on a weight basis. Although GTL process water is abundantly produced, a disadvantage of using GTL process water as an aqueous stream, is that GTL process water may contain acidic contaminants, such as, for example, acetic acid and/or other organic acids. Acidic contaminants present in GTL process water can lower the pH, thereby reducing the solubility of $CO_2$ therein. As a result, if GTL process water is used for scrubbing $CO_2$, it is preferable to remove acidic contaminants from the GTL process water before using it as a scrubbing stream. The acidic contaminants in GTL process water can be removed using various known methods. Suitable methods for removing acidic component from GTL process water include, but are not limited to, distillation, adsorption onto alumina or a basic material, oxidation, combinations thereof and the like.

In addition to pH and acidic contaminant composition, it may also be important to limit the oxygen content of the aqueous stream. Preferably, an aqueous stream is de-aerated before being used for scrubbing to increase the aqueous stream's capacity to adsorb $CO_2$ and to minimize the amount of air introduced into the gas stream. Suitable processes for de-aeration of aqueous streams are well known in the art and are used, for example, in desalination plants and for preparation of boiler feed water. Such processes are described in detail, for example, in John H. Perry's Chemical Engineering Handbook, 4th Edition, pages 9–51, McGraw Hill Book Company, 1963.

If the $CO_2$-containing tail gas stream contains relatively low amounts of $CO_2$ in comparison to other gases, the aqueous stream may not be as highly selective to scrubbing of $CO_2$. In this case, it may be preferable to conduct scrubbing in stages. For instance, a first selective $CO_2$ scrubbing operation may be conducted, followed by desorption to generate a concentrated $CO_2$ gas stream. Finally, scrubbing may be conducted with the aqueous stream. In preferred embodiments, conditions during disposal of the $CO_2$-enriched aqueous phase are such that a high percentage of the $CO_2$ removed from the $CO_2$-containing gas during scrubbing remains dissolved in the aqueous phase.

Scrubbing of $CO_2$ from gases using aqueous liquids should be performed at non-extreme pressures to avoid formation of methane, $CO_2$ and other hydrates. The dissolution of $CO_2$ in water is favored at high pressures. Thus, it is preferable to operate at as high a pressure as possible, and within economic limits. Accordingly, gas compression may be desirable, although the typical elevated pressures of a GTL facility will often suffice.

In addition to the importance of monitoring pressure during scrubbing, it may also be important to monitor temperature. For instance, at high temperatures and elevated pressures, hydrate formation can occur. In addition, at lower temperatures, gases may become more soluble in water, resulting in higher selectivity for the removal of $CO_2$ over methane and other valuable hydrocarbons.

In addition to pressure and temperature, salinity can also affect the solubility of hydrocarbons in water. For example, a larger "salting-out" effect can occur when using non-ionic hydrocarbons such as, for example, methane. Accordingly, variations in temperature and salinity of an aqueous solution can be used to maximize selectivity for $CO_2$ removal. In addition, the presence of salt in sea water can create a slight tendency to reduce the temperature at which hydrates will form. Yet another advantage of sea water as an adsorbent is its pH, which is often above 7.0, and thus facilitates the adsorption of CO2.

In recycle gas operation, the composition of a blended syngas to a Fischer-Tropsch unit will change as $CO_2$ is recycled to the syngas formation reactor. Other inert gas components will increase in concentration, while the reactive syngas components will remain essentially constant. The blended syngas is the mixture of the fresh syngas from the syngas generator and the syngas that is recycled. The following table provides typical ranges of blended syngas compositions for a process that generates syngas from an $O_2$ source of about 99.5 percent purity.

| Component, mol % | Typical Fischer-Tropsch Unit without $CO_2$ conversion | With low level of $CO_2$ removal | With moderate level $CO_2$ removal | With high level of $CO_2$ removal |
|---|---|---|---|---|
| $H_2$ | 30 | 30 | 30 | 30 |
| CO | 40 | 40 | 40 | 40 |
| $CO_2$ | 20 | 15 | 10 | 8 |
| $N_2$ + Ar | 2 | 3 | 4 | 7 |
| $C_1$ + Hydrocarbons | 8 | 12 | 16 | 21 |

It should be recognized that not all the unreacted syngas from the syngas conversion reactor needs to be processed in the scrubber. Since $CO_2$ builds up slowly, and reasonable concentrations of $CO_2$ can be tolerated (<60 mol %), only a portion of the syngas needs to be processed to achieve the desired $CO_2$ conversion. This can keep the size of the scrubber and $CO_2$ recycle stream relatively small.

Under some circumstances, it may not be desirable to process unreacted syngas from the syngas conversion reactor and recycle the $CO_2$-depleted syngas back to the syngas conversion reactor. It may be preferable to process the portion of the unreacted syngas from the syngas conversion reactor that is intended for use as a fuel. This option also achieves the goal of the invention to reduce $CO_2$ emissions.

It may be desirable to scrub the syngas from the syngas generator. In particular, the formation of syngas in the generator is known to create traces of organic nitrogen impurities (including HCN and $NH_3$). These organic nitrogen impurities, unlike $N_2$, are poisonous to the Fischer-Tropsch catalyst. The formation of these catalytically poisonous nitrogen impurities during syngas generation is described in U.S. Pat. Nos. 6,063,349 and 5,929,126. The nitrogen compounds deactivate the Fischer-Tropsch catalyst and thus require more catalyst and larger reactor volumes for this expensive process than would otherwise be needed if these nitrogen compounds were not present. In addition to deactivating the Fischer-Tropsch catalyst, the nitrogen impurities will be incorporated into the Fischer-Tropsch products. When incorporated in the Fischer-Tropsch products, they can make upgrading of these products into salable products more difficult. Under these circumstances, aqueous scrubbing of the syngas from the syngas generator to remove $CO_2$ also offers the advantage of simultaneously reducing the concentration of the catalytically poisonous nitrogen compounds. The level of reduction of HCN should be at least 30%, preferably at least 50%, and most preferably, at least 80%. The reduction in the NH3 level should be equivalent to the reduction of HCN. Some Fischer Tropsch catalysts will also catalyze the formation of NH3 from N2 and H2 in the feed. This can result in small quantities of catalytically poisonous NH3 in syngas streams exiting the Fischer Tropsch reactor. Aqueous scrubbing can remove this NH3.

It may not be practical to process all the recovered $CO_2$ in the syngas generator. Excess $CO_2$ can be disposed of by injecting it into a marine environment, a terrestrial formation, or both.

Water is a natural product of the syngas generation and syngas conversion reactions. Preferably, the water from both syngas generation and syngas conversion reactors is separated prior to further processing. If not removed, the water can promote the undesirable reverse water gas shift reaction which converts CO into additional $CO_2$. The removal of reaction water formed by the syngas generation and syngas conversion reactions will also remove some dissolved $CO_2$. Additional water can be added to remove more $CO_2$ by use of the same separation vessels which remove the reaction waters.

The desorption of $CO_2$ from the $CO_2$-rich aqueous stream obtained from the scrubber can be achieved either by lowering the pressure (commonly known as pressure swing) or increasing the temperature (commonly known as temperature swing). Since the objective is to use the $CO_2$ in the syngas formation reactor, which operates at pressures close to the syngas conversion unit, it is preferred not to significantly reduce the pressure to desorb the $CO_2$. Rather, it is preferable to desorb the $CO_2$ by increasing the temperature. The most common adsorbents for removal of $CO_2$ from gas streams are amines. These compounds will decompose if heated to excessive temperatures, and thus they are almost always used in pressure swing adsorption units. The use of an aqueous medium, without significant amounts of amines, in this invention to adsorb $CO_2$ eliminates the potential problems of decomposition in a temperature swing operation. Thus, the use of an aqueous medium to selectively remove the $CO_2$ and optionally part of the $CH_4$ in a temperature swing operation permits the recovery of $CO_2$ without significant pressure loss. In comparison, the conventional technology of using amines in a pressure swing adsorption system is quite costly. As noted previously, in EP 0 516 441 A1 it is estimated that the costs associated with removing and recycling $CO_2$ represents around 30% of the costs associated with producing the syngas itself. In practice, there may be some pressure drop between the adsorption and desorption steps. However, the pressure of the desorption step should be above atmospheric pressure to minimize $CO_2$ compression costs. Preferably, the pressure in the desorption stage should not be less than about 100 psi below the outlet pressure of the syngas conversion step. Likewise, the pressure in the adsorption scrubber preferably should not be less than about 50 psi below the outlet pressure of the syngas conversion step. In keeping with the concepts of temperature swing adsorption, the temperature of the desorption step preferably is in excess of the temperature of the adsorption step. The heat needed to desorb the CO2 from the CO2-rich stream can be provided from other streams in the GTL process including but not limited to streams associated with the syngas formation reactor, syngas conversion reactor, and reactors used to upgrade the product from the syngas conversion reactor. The CO2-depleted stream needs to be cooled prior to adsorption of the CO2. This cooling can also come from a variety of sources including but not limited to: river water, air cooling, and gas streams from the air separation unit (N2, O2, etc.), and combinations.

When excess $CO_2$ is to be disposed in a marine environment, a terrestrial formation or both, the aqueous scrubbing concept of this invention has an advantage over the current commercial technology of amine scrubbing because the recovered $CO_2$ is produced at pressures close to that of the syngas conversion unit. This minimizes the amount of expensive compression needed to dispose of the $CO_2$. The $CO_2$ leaving the desorber is not likely to be at sufficient pressure to be directly injected into a marine environment or a terrestrial formation. Most likely it would need additional compression and cooling. The energy and cooling for this step can be obtained from other sources in the process including: cooling water, the syngas generator, or gas streams associated with an $O_2$ purification plant (such as the cold $N_2$ waste gas) and the like.

There is another option for disposal of $CO_2$. After desorption from the aqueous solution and recovery of $CO_2$ gas at above atmospheric pressure, the $CO_2$ can be adsorbed into a second aqueous stream, such as sea water, brine, river water, or other non-potable water. This second aqueous stream containing dissolved $CO_2$ can then be disposed in a marine environment or terrestrial formation. Using such a two-water system permits the more valuable fresh water used in the initial recovery to be recycled, while the less valuable second aqueous stream is used as a disposal vehicle. Disposing of the $CO_2$ as a dissolved aqueous phase reduces the costs associated with compressing and possibly liquefying the $CO_2$ so that it can be disposed. Compression and liquefaction of a gas use expensive compressors, while compression of a liquid (the $CO_2$-containing second water stream) uses inexpensive pumps. The choice between the two options (disposal of relatively pure gaseous or liquid $CO_2$, or disposal of an aqueous $CO_2$ mixture) depends on the details of the disposal location.

The feasibility of disposing of extra water associated with the aqueous $CO_2$ mixture depends upon whether the marine or terrestrial formation is located at the plant site; the pressure needed for disposal in these locations, and other factors. The use of two aqueous streams has another advantage. Regulations regarding the disposal of wastes in marine environments may require very low levels of liquid hydrocarbons to avoid formation of an oil sheen or pollution. The two-water system isolates $CO_2$ as a $CO_2$-rich gas and reduces the chance that hydrocarbons will be included in the $CO_2$ when it is disposed in a marine environment.

An additional advantage of the process of the invention resides in the supply of water to the syngas formation reactor. Typically, some water is added to a syngas formation reactor in order to control coking, and promote steam reforming. Typical values of $H_2O$/carbon molar ratios are about 0.1 to 5.0/1.0, preferably 0.2 to 0.8. As the $CO_2$ is desorbed from the $CO_2$-rich aqueous stream, water will also be present in the vapor phase. This water can supplement or supply all of the water needed for the syngas formation reactor. Use of water in a temperature swing adsorption system will provide a water-rich $CO_2$ stream and higher temperatures can be selected in the desorption step to provide the needed amount of water. This will deplete the water in the scrubbing system, but makeup water to the scrubbing system can be obtained from boiler feed water, and the ultimate source of the water for the process can be water derived from the syngas conversion process, river water, water from an aquifer, or desalinated sea water.

Eventually, the scrubbing aqueous medium may accumulate contaminants from the syngas conversion process. These include hydrocarbonaceous species such as light paraffins, alcohols, and acids such as acetic and formic. For the most part, these contaminants are not a problem, with the exception of the acids. The acids will lower the pH of the scrubbing aqueous medium which will decrease the capacity of the system to adsorb $CO_2$. To prevent this decline in capacity, the aqueous scrubbing medium should be maintained in a relatively pure state with a pH value above 5, preferably above 6, and most preferably above 6.5. This can be done by a number of methods which include taking a purge stream of the scrubbing medium and replacing it with fresh water; treating the scrubbing medium with an adsorbent to remove the acids; distilling the water; and neutralization with a basic compound (caustic, sodium salt, nitrogen compound, and the like).

These processing steps can be part of the water recovery systems employed to treat the water produced in the syngas generator or the syngas converter. The pH of the aqueous stream needs to be measured on a $CO_2$-free sample. This can be done by bubbling $N_2$ through the sample at atmospheric pressure for 24 hours at 25° C. at 10 cm$^3$ of $N_2$ per ml of water per minute.

It is well known in the industry that water-rich $CO_2$ gas streams and $CO_2$-rich aqueous streams are moderately corrosive. This will likely necessitate the use of a stainless steel or a corrosion inhibitor to avoid excessive corrosion. Selection of appropriate materials of construction can be done by typical methods such as coupon tests and the like. A review of the corrosion properties of $CO_2$ is provided in *Metals Handbook, 9$^{th}$ Edition, Volume 13 Corrosion*, ASM International, 1987, especially pages 896–897, 1233, and 1247.

The scrubbing of $CO_2$ from gases by an aqueous medium must operate at non-extreme pressures to avoid formation of hydrates of $CH_4$, $CO_2$, and other hydrates. The dissolution of $CO_2$ in water is favored at higher pressures. It is preferred to operate at as high a pressure as possible (and within economic limits; compression of the gas is not favored). There is also a tradeoff with respect to temperature. At higher temperatures, hydrate formation occurs at higher pressures. Lower temperature, on the other hand, results in higher solubility of gases into water (all else being the same), and results in higher selectivity for the removal of $CO_2$ over $CH_4$ and other valuable hydrocarbons.

From literature references, the maximum pressure that can be tolerated to avoid hydrate formation at various temperatures for $CH_4$ and $CO_2$ are:

|  | Pure $CH_4$ | | Pure $CO_2$ | |
| --- | --- | --- | --- | --- |
|  | 2° C. | 8° C. | 0° C. | 10° C. |
| Maximum Pressure, Psia | 2.9 MPa (430 psi) | 6.1 MPa (900 psi) | 1.3 MPa (192 psi) | 14 MPa (2000 psi) |
| Equivalent hydrostatic water depth, feed (62.4 lb/ft$^3$ water density) | 1000 ft | 2,100 ft | 450 ft | 4,800 ft |

(1 Pa = 1.02 × 10−5 atm) (for water: 2.31 ft/psi at specific gravity)

The source of this data is E. Dendy Sloan Jr., *Clathrate Hydrates of Natural Gases*, Marcel Dekker, Inc. 1990. Sloan also gives numerous examples of gas mixtures and the resulting temperatures/pressures at which hydrates form. The allowable operating pressure/temperature combination is determined on a case-by-case basis for each gas composition. Methods for estimating these operating conditions are described in Sloan. For the typical case of a light gas, an operating pressure of 300 psig and 10° C. will not form hydrates.

To avoid formation of hydrates, pressures less than maximum normally should be used. However, hydrate formation is also controlled by kinetics and heat transfer; thus, pressures near or above this limit can be used as long as the residence time is short.

The Henry's Law constants for $CO_2$ and $CH_4$ in pure water and sea water are:

|  | $CH_4$ | | $CO_2$ | |
| --- | --- | --- | --- | --- |
|  | 0° C. | 30° C. | 0° C. | 30° C. |
| Henry's Law Constant in Water (atm/mole fraction) | 22,000 | 42,000 | 740 | 1,850 |
| Henry's Law Constant in Sea Water (estimated) | 40,000 |  | 740 |  |

Sources of Solubility Data include:

(Clifford N. Click, "Applications of Henry's Law to Waste and Process Water VOC Emissions", 85$^{th}$ annual meeting Air and Waste Management Association. (Gives Henry's Law coefficients for several light hydrocarbon gases in water as a function of temperature and also gives an equation for the brine effect.)

Gianni Astartita, David Savage, and Attilio Bisio, Gas Treating with Chemical Solvents, Wiley, pp 208. (Contains a plot of the Henry's Law coefficient physical solubility of $CO_2$ into water as a function of temperature.)

John Nighswander, Nicholas Kalogerakis, Anil Mehrotra, "Solubilities of Carbon Dioxide in Water and 1 wt % NaCl Solution at Pressures up to 10 MPa and temperatures from 80 to 200 Degrees C", J. Chem. Eng. Data 1989, 34, 355–360. (Observes that the effect of salt on $CO_2$ solubility in water over the ranges of 80 to 200° C. and at pressures of up to 10 MPa is very small.)

While this invention reduces the amount of $CO_2$ released into the environment by processing more of it in the syngas formation reactor, there are other inert components in the syngas that will eventually build up to high enough levels such that some syngas will have to be ejected from the process. These components include $CH_4$, $N_2$, Ar, and other inert gas elements. The $CH_4$ originates from $CH_4$ slip in the syngas generator and $CH_4$ formation in the Fischer-Tropsch unit. The $N_2$, Ar, and other inert gas elements come from the air separation unit, and possibly from the original natural gas feedstock. Normally, $CO_2$ is the most abundant inert gas component, but when it is removed by the technology of this invention, the other inert gas components will increase in concentration. Thus, some purging of syngas will be necessary and a suitable use for this diluted syngas is as a fuel.

$CO_2$ in the recycle gas to the Fischer-Tropsch reactor provides several advantages. It acts as a diluent, for the reactive syngas components. It acts to dissipate some of the heat and improves process control. As CO and H2 are consumed in the Fischer-Tropsch reactor, other inert gas components ($CH_4$, $N_2$ and Ar) build up in the recycle gas. They substitute for the extracted $CO_2$ by improving the management of heat release in the Fischer-Tropsch unit. This means that more of the carbon in the recycle gas can be processed. Eventually, the $N_2$ and Ar will have to be purged from the system.

The invention will now be illustrated by the following Example which is intended to be merely exemplary and in no manner limiting. The reference numerals in FIG. 2 are the same as those used in FIG. 1 and refer to identical locations.

EXAMPLE 1

Figure 2:
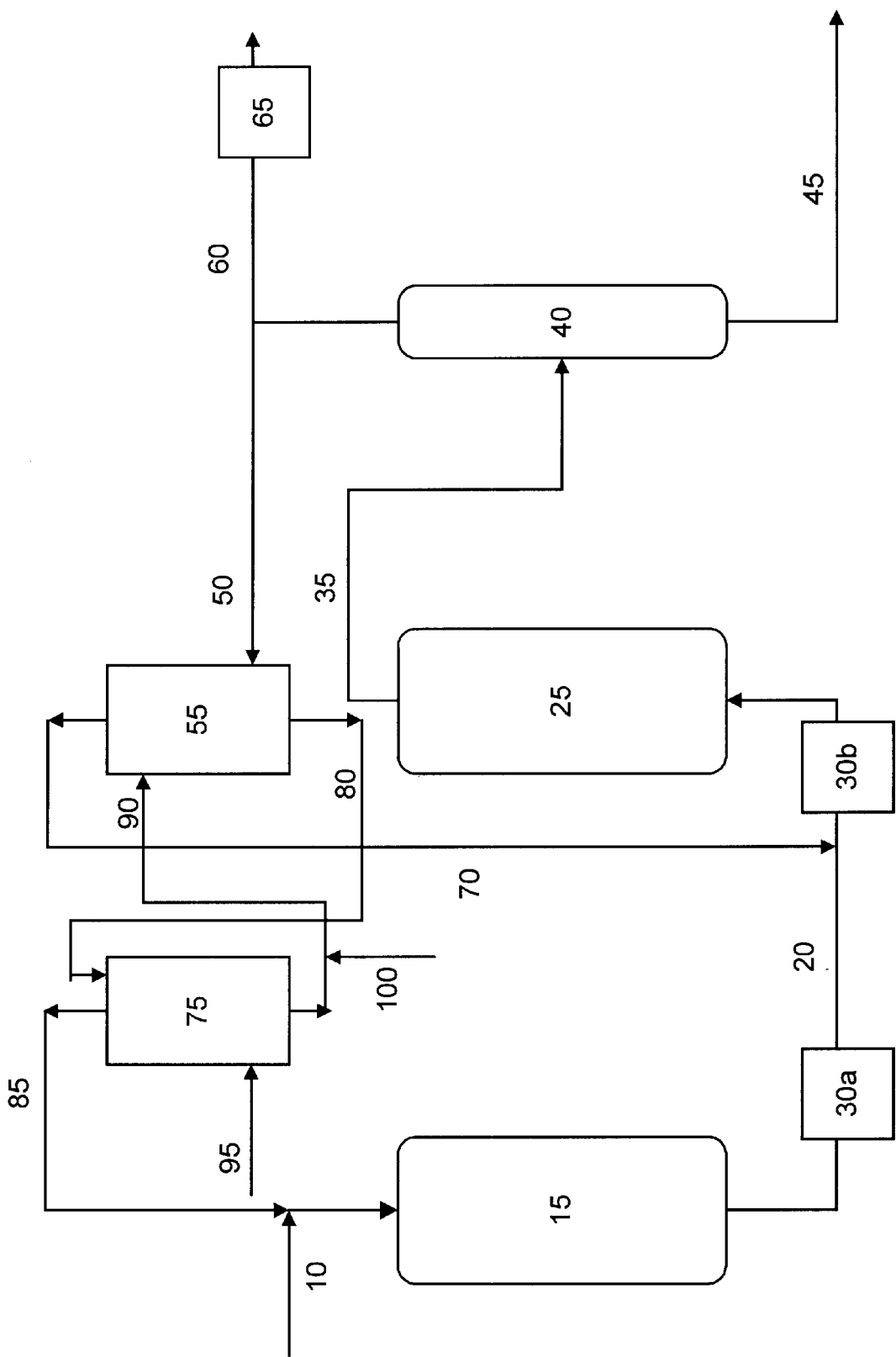
FIG. 2 is a schematic flow diagram of one embodiment of the invention.

With reference to FIG. 2, a mixture of $CH_4$, $O_2$ and $H_2O$ is introduced via conduit (10) to a syngas generator (15). Product from reactor (15) is conducted via conduit (20) to a syngas converter (25), specifically a Fischer-Tropsch reactor. Optionally, a scrubber (30a) can be located downstream of the syngas generator or upstream of the syngas converter (25) to remove materials such as nitrogen contaminants, particulates, excess $CO_2$, unreacted $CH_4$, etc. from the products of the syngas generator before circulation to reactor (25). The syngas in the Fischer-Tropsch reactor is reacted in the presence of a non-shifting catalyst at a pressure of 300 psig to produce a variety of hydrocarbonaceous productors. Effluent from the reactor (25) is circulated via conduit (35) to a separation zone (40). Hydrocarbon products including $C_5$+ liquids are removed from the separation zone via conduit (45) to be further processed into salable products. A tail gas is collected from the separation zone. The tail gas has the following composition on a water-free basis:

| | | |
|---|---|---|
| $CH_4$ | 13% | |
| $CO_2$ | 35% | |
| CO | 25% | |
| $H_2$ | 25% | |
| Inerts ($N_2$) | 2% | |

The gas is used in two operations, recycle to the Fischer-Tropsch unit and for fuel gas. One portion is circulated via conduit (50) to a scrubbing zone (55) and scrubbed with de-aerated water to avoid introduction of contaminants into the Fischer-Tropsch unit. The fuel gas is circulated via conduit (60) to a scrubbing zone (65) and scrubbed with water. Both scrubbing operations are done at 20° C. The tail gas is scrubbed to remove 50% of the $CO_2$ and the fuel gas is scrubbed to remove 75%. Contact is counter-current. The pressure in the scrubbing zone (55) is generally within 100 psig and preferably within 50 psi of the pressure of the outlet of the separation zone (40).

A $CO_2$-depleted syngas is recovered from scrubbing zone (55). It is recycled via conduit (70) to conduit (20) where it is admixed with fresh syngas and forwarded to reactor (25).

A $CO_2$-enriched aqueous stream (80) is forwarded to desorption zone (75) where $CO_2$ and optionally $CH_4$ are removed and recycled (85) to reactor (15). A $CO_2$-depleted aqueous stream (90) is recovered from desorption zone (75) and circulated to scrubbing zone (55). A makeup water is added through conduit (100). The recovery of $Co_2$ from desorption zone (75) may be facilitated by injecting a gaseous stream (95), such as methane, into desorption zone (75).

Water is formed in both the syngas generator and the syngas conversion reactors. It is separated and removed from the other products of these reactions.

Henry's Law constants are given in Kohl (Arthur Kohl and Richard Nielsen, Gas Purification, Gulf Publishing Company, 1997, pp 417–465). This source also provides the temperature dependence of the constants.

| | | |
|---|---|---|
| $CH_4$ | 13% | 37,800 |
| $CO_2$ | 35% | 1,460 |
| CO | 25% | 53,600 |
| $H_2$ | 25% | 68,300 |
| Inerts ($N_2$) | 2% | 80,400 |

HCN is extremely soluble in water. The Merck Index says it is water-miscible. From the International Critical Tables, Vol. 3, page 365: Henry's Constant at 25 C for HCN in Water=4810 mm Hg/mol fraction Converting it to atm gives: H=6.32 atm/mol fraction. One other data set on the solubility of HCN in water is at 18° C., in the form of a "Partial Pressure vs. Mole Fraction" Table. Using the most dilute point, and linear extrapolation from zero, gives H=4.39 atm/mol fraction. Thus HCN is more solubile in water than $CO_2$, and systems designed to remove $CO_2$ should simultaneously remove an even greater amount of HCN. $NH_3$ is likewise easily removed by water along with $CO_2$.

Four cases were studied by the well-known Kremser-Brown Method. This method provides an analytical estimate of the staging, scrubbing, and stripping requirements. It is also designed to handle multi-component systems.

Case 1—Scrubbing the tail gas. 50% of the $CO_2$ was absorbed from the unreacted syngas using water at 20° C. and 315 psia. Then, 99.5% of the $CO_2$ was recovered in a water-rich $CO_2$ stream and recycled back to the syngas generator. No $CH_4$ purge is used, so all of the stripping comes from steam generation at 315 psia (217° C.).

Case 2—Scrubbing the tail gas. 50% of the $CO_2$ was absorbed from the unreacted syngas using water at 20°C. and 315 psia. Then, 99.5% of the $CO_2$ was recovered using $CH_4$ stripping at 100° C. No reboiler is used, so there should be very little water in the desorbed gas.

Case 3—Scrubbing the tail gas. Same flowsheet, except that $CH_4$ stripping is done at 50° C.

Case 4—Scrubbing the fuel gas. 75% of the $CO_2$ was absorbed from the unreacted syngas using sea water at 20° C. and 315 psia. The scrubbed gases are used as fuel. Then, 99.5% of the $CO_2$ was recovered in a water-rich $CO_2$ stream. The $CO_2$-rich, desorbed gases are sequestered. No external purge is used, so all of the stripping comes from steam generation at 315 psia (217° C.).

The composition of the scrubbed gas and the desorbed gases for the four cases were calculated by the Kremser-Brown Method with a 100 mol basis of gas to the adsorber.

|  | Case 1 | | | Case 2 | | | Case 3 | | | Case 4 | | |
|---|---|---|---|---|---|---|---|---|---|---|---|---|
| Scrubbed Gas Stream | | | | | | | | | | | | |
| Total Flow, kmol | 81.59 | | | 81.59 | | | 81.59 | | | 72.34 | | |
| Composition: Mol/100 mol feed to adsorber ($H_2$ free) mole % | | | | | | | | | | | | |
| $CO_2$ | 17.5 | 21.4 | 50 | 17.5 | 21.4 | 50 | 17.5 | 21.4 | 50 | 8.8 | 12.1 | 75 |
| $CH_4$ | 12.7 | 15.6 | 2 | 12.7 | 15.6 | 2 | 12.7 | 15.6 | 2 | 12.6 | 17.4 | 3 |
| CO | 24.6 | 30.2 | 1 | 24.6 | 30.2 | 1 | 24.6 | 30.2 | 1 | 24.4 | 33.8 | 2 |
| $H_2$ | 24.7 | 30.3 | 1 | 24.7 | 30.3 | 1 | 24.7 | 30.3 | 1 | 24.6 | 34.0 | 2 |
| $N_2$ | 2.0 | 2.4 | 1 | 2.0 | 2.4 | 1 | 2.0 | 2.4 | 1 | 2.0 | 2.7 | 1 |
| Desorbed Gas Stream | | | | | | | | | | | | |
| Total Flow, kmol/hr | 23 | | | 69 | | | 139 | | | 36 | | |
| Composition: Mol/100 mol feed to adsorber ($H_2$ free) mole % | | | | | | | | | | | | |
| $CO_2$ | 17.4 | 99.5 | | 17.4 | 25.3 | | 17.4 | 12.5 | | 26.1 | 72.9 | |
| $CH_4$ | 0.26 | 1.1 | | 0.26 | 0.4 | | 0.26 | 0.2 | | 0.40 | 1.1 | |
| CO | 0.35 | 1.5 | | 0.35 | 0.5 | | 0.35 | 0.3 | | 0.55 | 1.5 | |
| $H_2$ | 0.28 | 1.2 | | 0.28 | 0.4 | | 0.28 | 0.2 | | 0.43 | 1.2 | |
| $N_2$ | 0.018 | 0.08 | | 0.018 | 0.03 | | 0.019 | 0.011 | | 0.03 | 0.08 | |
| $H_2O$ | 4.56 | — | | | | | | | | 8.49 | — | |
| $CH_4$ as Purge Gas | | | | 50.7 | 73.4 | | 120.7 | 86.9 | | | | |

The sizes of the equipment and water rates required for a commercial-scale unit are shown next.

|  | Case 1 | Case 2 | Case 3 | Case 4 |
|---|---|---|---|---|
| Absorber | | | | |
| Feed Gas Flowrate (kmol/hr) | 2000 | 2000 | 2000 | 5000 |
| Operating Temperature (° C.) | 20 | 20 | 20 | 20 |
| Operating Pressure (psia) | 315 | 315 | 315 | 315 |
| Theoretical Stages | 4 | 4 | 4 | 6 |
| Theoretical Water Requirement (mol liq/mol gas) | 35.35 | 35.35 | 35.35 | 54.83 |
| Practical Water Requirement (mol liq/mol gas) | 52.5 | 52.5 | 52.5 | 82.25 |
| Height (ft) | 16 | 16 | 16 | 24 |
| Diameter (ft) | 12.4 | 12.4 | 12.4 | 24.97 |
| Stripper | | | | |
| Desorbed Gas Flowrate (kmol/hr) | 460 | 1380 | 2780 | 1800 |
| Operating Temperature (° C.) | 217 | 100 | 50 | 217 |
| Operating Pressure (psia) | 315 | 315 | 315 | 315 |
| Theoretical Stages | 3 | 3 | 3 | 3 |
| Theoretical Stripping Requirement (mol liq/mol gas) | 153 | 51.5 | 25.38 | 153 |
| Practical Stripping Requirement (mol liq/mol gas) | 76.5 | 25.75 | 12.69 | 76.5 |
| Height (ft) | 12 | 12 | 12 | 12 |
| Diameter (ft) | 8.04 | 7.53 | 7.64 | 15.89 |

These results show that reasonable designs for adsorption and desorption columns can be used to provide high levels of $CO_2$ removal. Removal of $CO_2$ does not remove significant quantities of valuable components ($H_2$, $CH_4$ and CO). The product gas streams are high purity $CO_2$ (when a reboiler is used) or $CO_2/CH_4$ mixtures when $CH_4$ is used as a stripping gas. The recovered $CO_2$, either as a neat stream or as a $CO_2/CH_4$ mixture, can be fed to the syngas generator.

The $CO_2$-water stream could be fed directly to the syngas generator. This would eliminate the need to have a separate $CO_2$ gas compressor for the recycle to the reformer. The portion of the $CO_2$-water stream not used in the syngas generator could be sent to the desorber, where the $CO_2$ is recovered and disposed.

When the lower $CO_2$-content syngas is fed back to the syngas converter, the $CO_2$ content in the blended synthesis drops from about 20% to lower values. Using typical flow rates, the $CO_2$ content will decline to about 15% if a low level of $CO_2$ is removed in the scrubber (about 25%), to about 10% if a moderate amount of $CO_2$ is removed (about 50%), and about 8% if a high level of $CO_2$ is removed (about 75%).

It should be recognized that while the above Example utilized a Fischer-Tropsch reactor as the preferred syngas converter, one could readily use a methanol synthesis in the scheme of the present invention. Details of the MTG process are well documented in the literature. Likewise, the benefits of the invention can be attained in a dual functional syngas conversion facility. A suitable system which integrates a Fischer-Tropsch synthesis and a methanol synthesis using syngas is described in U.S. Pat. No. 6,248,794.

While the invention has been described with preferred embodiments, it is to be understood that variations and modification may be resorted to as will be apparent to those skilled in the art. Such variations and modifications are to be considered within the purview and the scope of the claims appended hereto.

What is claimed is:

1. A process comprising the following steps:
   (a) forming a syngas which contains $CO_2$ in a syngas generator;
   (b) reacting the syngas in a syngas conversion process to form a product stream comprising hydrocarbonaceous products and a tail gas containing unreacted syngas and $CO_2$;

(c) separating the hydrocarbonaceous products from the unreacted syngas and $CO_2$ in a separation zone;

(d) contacting at least a portion of the unreacted syngas and $CO_2$ with an aqueous medium having a pH above about 6.0 in a scrubbing zone to adsorb at least a portion of the $CO_2$, and recovering a $CO_2$-enriched aqueous stream and a syngas with reduced $CO_2$ concentration;

(e) forwarding at least part of the recovered syngas from step (d) to the syngas conversion reactor; and (f) desorbing at least part of the $CO_2$ from the $CO_2$-enriched aqueous stream obtained in step (d) and recovering a $CO_2$-rich gas and $CO_2$-depleted aqueous stream.

2. A process according to claim 1 further comprising recycling at least part of said $CO_2$-depleted aqueous stream to said scrubbing zone.

3. A process according to claim 1, further comprising recycling at least part of said $CO_2$-rich gas to the syngas generator.

4. A process according to claim 1 wherein the syngas is manufactured from natural gas, coal, petroleum products or combinations thereof.

5. A process according to claim 1, wherein the amount of $CO_2$ removed in step (d) is between about 10 and 90 wt % of the amount present in said tail gas.

6. A process according to claim 5, wherein the amount of $CO_2$ removed is between about 25 and 60%.

7. A process according to claim 1, wherein the syngas conversion process is a Fischer-Tropsch synthesis.

8. A process according to claim 1, further comprising removal of at least about 5% of any $CH_4$ present in the unreacted syngas in step (d).

9. A process according to claim 8, wherein the amount of $CH_4$ removed is between about 10 and 50%.

10. A process according to claim 1, wherein pressure in the scrubbing zone is within 100 psi of the pressure of an outlet of the separator.

11. A process according to claim 1, wherein the pressure is within 50 psi of the outlet of the separation zone.

12. A process according to claim 1, wherein the pressure is within 100 psi of the outlet of the separation zone.

13. A process according to claim 1, wherein the syngas formed in step (a) is blended with the syngas recovered in step (d) and forwarded to the conversion reactor.

14. A process according to claim 13, wherein the $CO_2$ content of the blended syngas is about 15 wt. % or less.

15. A process according to claim 1, further including the step of disposing at least a portion of the $CO_2$-enriched aqueous stream from step (d) in a marine environment, a terrestrial formation, or both.

16. A process according to claim 1, further including the step of dissolving at least a portion of the $CO_2$ in the $CO_2$-rich gas from step (f) in an aqueous phase and disposing the aqueous phase in a marine environment, a terrestrial formation, or both.

17. A process according to claim 16, wherein the source of the aqueous medium is sea water, river water, brine, non-potable water, or combinations thereof.

18. A process according to claim 1, wherein the scrubbing and desorbing steps are conducted at a pressure above atmospheric.

19. A process according to claim 1, wherein the aqueous medium used in step (d) has a pH of about 7.5 to 11.0 when measured on a $CO_2$-free sample.

20. A process comprising the following steps:

(a) forming a syngas which contains at least about 2 vol % $CO_2$ in a syngas generator;

(b) reacting at least a portion of the syngas in a Fischer-Tropsch process to form a product stream comprising hydrocarbonaceous products and a tail gas containing unreacted syngas and $CO_2$;

(c) contacting at least a portion of the unreacted syngas and $CO_2$ with an aqueous medium having a pH above about 7.0 in a scrubbing zone at above atmospheric pressure to preferentially absorb at least part of the $CO_2$ and recovering a $CO_2$-enriched aqueous stream, and a syngas with a reduced $CO_2$ concentration;

(d) recycling at least part of the syngas from step (c) to the Fischer-Tropsch process;

(e) desorbing the $CO_2$-enriched aqueous stream from step (c) to obtain a $CO_2$-rich gas and a $CO_2$-depleted aqueous stream; and (f) circulating the $CO_2$-depleted aqueous stream to the scrubber in step (c).

21. A process according to claim 20, wherein at least part of said $CO_2$-rich gas is recycled to the syngas generator.

22. A process according to claim 20, wherein a portion of the syngas and $CO_2$ from step (c) is used as a fuel.

23. A process according to claim 20, wherein the pH of the aqueous medium is about 7.5 to 11.0.

24. A process for manufacture of products from syngas comprising:

(a) forming a syngas which contains $CO_2$ in a syngas generator;

(b) contacting at least a portion of the syngas with an aqueous medium having a pH above about 7.0 in a scrubbing zone at above atmospheric pressure to remove at least a portion of the $CO_2$ and recovering a $CO_2$-enriched aqueous stream and syngas with a lower $CO_2$ concentration than the syngas obtained in step (a);

(c) reacting at least a portion of the syngas obtained in step (b) in a syngas conversion reaction to form a product stream comprising hydrocarbonaceous products and a tail gas containing $CO_2$ and unreacted syngas;

(d) desorbing at above atmospheric pressure at least part of the $CO_2$ in the $CO_2$-enriched aqueous stream from step (b) to obtain a $CO_2$-rich gas and $CO_2$-depleted aqueous stream;

(e) forwarding at least part of the $CO_2$-rich gas to the syngas generator;

(f) recycling at least part of the tail gas from step (c) to the syngas conversion reactor; and (g) dissolving at least part of the $CO_2$-rich gas in an aqueous medium.

25. A process according to claim 24, further comprising using at least part of the tail gas as a fuel.

26. A process according to claim 24, wherein the hydrocarbonaceous products from step (c) are further processed into salable products.

27. A process according to claim 24, further comprising the step of removing at least 30% of any $NH_3$ or HCN present in the syngas during the scrubbing operation in step (b).

28. A process according to claim 24, wherein the syngas conversion reaction in step (c) comprises a Fischer-Tropsch synthesis.

29. A process according to claim 24, where the aqueous medium in step (b) has a pH of about 7.5 to 11.0 when measured on a $CO_2$-free sample.

* * * * *